US005600441A

United States Patent [19]
de Groot et al.

[11] Patent Number: 5,600,441
[45] Date of Patent: Feb. 4, 1997

[54] INTERFEROMETER AND METHOD FOR MEASURING THE DISTANCE OF AN OBJECT SURFACE WITH RESPECT TO THE SURFACE OF A ROTATING DISK

[75] Inventors: Peter de Groot; Leslie L. Deck, both of Middletown, Conn.

[73] Assignee: Zygo Corporation, Middlefield, Conn.

[21] Appl. No.: 381,232

[22] Filed: Jan. 31, 1995

[51] Int. Cl.[6] ........................................ G01B 9/02
[52] U.S. Cl. ............................. 356/357; 356/357
[58] Field of Search ............................. 356/345, 351, 356/357, 358

[56] References Cited

U.S. PATENT DOCUMENTS

| | | |
|---|---|---|
| 3,855,625 | 12/1974 | Garnler et al. |
| 4,593,368 | 6/1986 | Fridge et al. ............... 356/357 |
| 4,606,638 | 8/1986 | Sommargren ............... 356/351 |
| 4,681,447 | 7/1987 | Davidson ................... 356/358 |
| 5,218,424 | 6/1993 | Sommargren ............... 356/351 |
| 5,280,340 | 1/1994 | Lacey ......................... 356/357 |

OTHER PUBLICATIONS

L-Y. Zhu, et al., "Measurement of Head/Disk Spacing with a Laser Interferometer," *IEEE Transactions On Magnetics*, vol., 234, No. 6, pp. 2739–2741, (Nov. 1988).
W. Stone, "A Proposed Method for Solving Some Problems in Lubrication–I.," *The Commonwealth Engineer*, pp. 115–122 (Nov. 1, 1921).
*Insight*, published by International Disk Drive Equipment and Materials Association (IDEMA), 12 pages, vol. VII, No. 5, (12 pages), (Sep./Oct. 1994).
T. Ohkubo et al., "Accurate Measurement of Gas–Lubricated Slider Bearing Separation Using Visible Laser Interferometry," *Transactions of the ASME*, pp. 148–155, vol. 110, pp. 148–155, (Jan. 1988).
G. L. Best, et al., "Precise Optical Measurement of Slider Dynamics," *IEEE Transactions on Magnetics*, vol. MAG–22, No. 5, pp. 1017–1018 (Sep. 1986).

B. Bhushan, *Tribology and Mechanics of Magnetic Storage Devices*, Springer–Verlag, pp. 765–797, 1990.
*IDEMA Sub 2–Microinch Fly Height Workshop Proceedings*, 109 pages, 1994.
G. L. Best, "Comparison of Optical and Captive Measurements of Slider Dynamics," *IEEE Transactions on Magnetics*, vol. MAG–23, No. 5, pp. 3453–1455, (Sep. 1987).

(List continued on next page.)

*Primary Examiner*—Samuel A. Turner
*Attorney, Agent, or Firm*—Bryan Cave LLP

[57] ABSTRACT

Optical method and means for high-speed characterization of the distance between a substantially transparent plane-parallel disk (20) in rotation about an axis (21) perpendicular to its largest surface, and a substantially flat object (30) that is nearly in contact with the disk surface (25). A collimated light beam (2) is first divided into two parallel, spatially separated and orthogonally polarized beams (5,7) which are incident upon the disk surface (25) at Brewster's angle. One beam (5) passes through the disk unreflected and impinges upon the surface of object (30) and reflects back from object (30). The other beam (7) is partially reflected from the bottom surface of the disk (25) and is subsequently recombined with beam (5) and caused to interfere. Optical means (90,91,100,110,150) together with electronic detection and analysis means (130,131; 120,121; 99) determine the phase of the interference. At the same time, a second pair of beams (6,8) is created by division of the collimated source light (2) into two parallel, spatially separated beams having a polarization chosen so that they both reflect from the disk surface (25) and a spatial position such that neither beam (6,8) is effected by the presence of the object (30). These beams (6,8) are recombined and caused to interfere. The phase difference is recorded electronically (130,132; 120,122; 99) and is used to remove from the first measurement the unwanted details concerning the variations in volume and surface profile of the disk (20) as it rotates. Specialized detector arrays (121,122;131,132) having independently-accessed detector elements, provided information about the orientation (pitch and roll) of the object at high speed for efficiently phase sampling along the surface of object (30).

22 Claims, 3 Drawing Sheets

OTHER PUBLICATIONS

M. V. Mantravadi, "Newton, Fizeau, and Haidinger Interferometers," *Optical Shop Testing, Second Edition*, Edited by Daniel Malacara, 48 pages, published by John Wiley & Sons, Inc. (1992).

A. Nigam, "A Visible Laser Interferometer for Air Bearing Separation Measurement to Submicron Accuracy," *Transactions of the ASME*, vol. 104, pp. 60–65 (Jan. 1982).

"Measuring the Flight Height of Magnetic Heads on Magnetic Disks", Makosch et al, IBM Technical Disclosure Bulletin vol. 15, No. 4, Sep. 1972.

INTERFEROMETER AND METHOD FOR MEASURING THE DISTANCE OF AN OBJECT SURFACE WITH RESPECT TO THE SURFACE OF A ROTATING DISK

FIELD OF THE INVENTION

The present invention relates to an apparatus and method for interferometrically measuring the distance between a test surface and a plano reference surface which are in close proximity to each other. More particularly, the invention relates to apparatus which accurately measures such distance down to zero at multiple points simultaneously on the test surface with high frequency response.

BACKGROUND AND PRIOR ART

In magnetic data storage systems, it is required to measure the flying height of a slider assembly near contact on a rapidly rotating rigid disk in order to verify the performance of the slider assembly. The flying height, as used herein, is the distance between the magnetic head pole and the surface of the rotating rigid disk; see, e.g., M. F. Garnier, et. al., U.S. Pat. No. 3,855,625 issued Dec. 17, 1974. The flying results from the aerodynamic effects produced by the rigid disk's rotation. The flying heights are generally less than 250 nm (10μ-inch) depending on the design of the slider, and may be as close as a few tens of nanometers. The trend in the art is toward very low flying heights, that is, less than 25 nanometers. In addition to the flying height, it is desirable to precisely measure the gap between the disk and the air bearing surface (ABS) over a number of points on the ABS, in order to determine the angular orientation of the slider, i.e. in terms of pitch and roll. The speed and reliability of the measurement is of particular importance, since a single slider manufacturer typically produces 200,000–500,000 slider assemblies per month.

Prior-art apparatus and methods for measuring the flying height of a slider assembly are disclosed in B. Bhushan, *Tribology and Mechanics of Magnetic Storage Devices*, pp. 765–797 (New York: Springer-Verlag, 1990). Some more recent developments are described in "Proceedings of the IDEMA Sub 2-micro inch Workshop", May 12, 1993. The various methods and means may be broadly divided into two classes of apparatus, referred to herein as electrical and optical flying-height testers.

Prior-art electrical flying-height testers typically employ capacitive-type sensors, see for example, G. L. Best, "Comparison of Optical and Capacitive Measurements of Slider Dynamics," IEEE Trans. on Magnetics, Vol. MAG-23, No. 5, pp. 3443–3455 (September 1987). The capacitive sensor approach is suitable for some laboratory testing but requires that a capacitive transducer be added to the slider to be tested. For production testing, this is neither practical nor cost effective. Furthermore, all of the aforementioned prior-art techniques provide poor spatial data sampling on the ABS.

Optical flying-height testers (OFHT's) are almost invariably based on interferometry. Interferometers are capable of determining the distance to an object, the topography of the object, or like physical parameters involving physical lengths (see, for example, Chapter 1 of the book *Optical Shop Testing*, second edition, edited by Daniel Malacara (Wiley, New York, 1992). One of the fundamental difficulties of optical techniques is that the interface between the slider ABS and a real hard disk cannot be inspected directly. Therefore, there are essentially two different types of OFHT's, those which perform a relative measurement the back side of the slider flying on a real disk, and those that use a transparent glass surrogate in place of a real hard disk.

An example of the first kind of OFHT is provided in an article entitled "Measurement of head/disk spacing with a laser interferometer," by L.-Y. Zhu, K. F. Hallamasek, and D. B. Bogy (IEEE Tran. Magn., MAG-23, 2739, 1988). The disclosed apparatus is a heterodyne interferometer capable of measuring the physical position of a plurality of points on the back side of a slider, that is, points on the side of the slider that is not in near contact with the disk. The advantages of this apparatus are that it functions with a real magnetic hard disk, and it is capable of measuring the orientation (pitch and roll) as well as the height of the slider in flight. Calibration for zero flying height is performed by landing the slider on the disk. The principle disadvantage of this kind of system is that the slider/disk interface is not observed directly, and the flying height can only be inferred from the position of the back side of the slider. Thus it must be assumed that the slider thickness and ABS shape are constant, while in fact there may be significant distortions of the slider due to mechanical and thermal stress during flight. Another disadvantage is that the back of the slider is currently not accessible on most production slider assemblies.

The first reported direct measurement of the slider/disk interface by interferometric means was reported by W. Stone in an article entitled "A proposed method for solving some problems in lubrication" (The Commonwealth Engineer, November 1921 and December 1921). Stone was obviously not working with magnetic storage media in 1921, but the essential concepts are the same ones that underlay the majority of modern OFHT's. Stone's apparatus comprises a glass disc about 125 mm in diameter so mounted that it can be rotated in a horizontal plane. A 15 mm-square block, substantially similar in function to a slider, is pressed against the lower surface of the disc through a suitable loading mechanism. Since the disk is transparent, it is possible to view the block through the disk while it is in flight. The block is illuminated through the disk with a sodium flame, which for the intended purpose acts as a nearly monochromatic light source. The reflected beam is composed of a combination of the light beam reflecting from the surface of the disk and the light beam reflecting from the block. The combination and simultaneous detection of these two reflected beams results in an interference effect related to the flying height of the block above the disk. The spacing between the block and the disk as well as the orientation of the block is deduced by visual inspection of the interference pattern as the disk varies in speed.

Modern commercial OFHT's that measure the slider/disk interface directly are based on many of the same physical principles as the apparatus invented by Stone, with the differences being principally in the type of source, detector and data processing means. A transparent surrogate disk replaces the magnetic hard disk and the interference effects at the slider ABS provide the flying height information. The interference pattern in these systems is analogous to that produced by a thin film of transparent material on a substrate. The interference pattern may therefore be said to be the result of a thin-film effect.

One form of OFHT uses the thin film effect together with a substantially monochromatic source light, as disclosed for example by G. L. Best, D. E. Horne, A. Chiou and H. Sussner, in a paper entitled "Precise optical measurement of slider dynamics," IEEE Trans. Magn. MAG-22, (1986) 1017–1019. The reflected light is modulated by the thin-film effect between the disk and the slider ABS. This modulation is periodic with the flying height, and has a period equal to one-half the wavelength of the source illumination. By introducing appropriate detection and analysis means, it is possible to track variations in the flying height by observing the modulations in intensity of the reflected light. Over certain portions of the modulation curve, it is possible by detection of the reflected intensity to determine the gap between the ABS and the disk with reasonable accuracy. Originally, such instruments involved a purely visual interpretation of the fringes. J. M. Fleischer and C. Lin were the first to use a photo-electric sensor in a monochromatic OFHT, as is described in an article entitled "Infrared laser interferometer for measuring air-bearing separation," (IBM Journal of Research and Development, 18(6), 1974, pp.529–533). A more modern example of monochromatic OFHT is described by T. Ohkubo and J. Kishegami in an article entitled "Accurate Measurement of Gas- Lubricated Slider Bearing Separation using Laser Interferometry," Trans. ASME, Vol 110, pp148–155 (January 1988). This article describes the basis of operation for the commercially available Model FM8801 and FM2000 Fly Height Testers sold in the U.S.A. by ProQuip, Inc.

In that the measurement depends on a periodic phenomenon, a disadvantage of the monochromatic OFHT is that it is not clear which interference cycle is being measured. There is consequently an ambiguity and the flying-height measurement is restricted to a range equal to one-quarter of the wavelength. A further difficulty is that there are significant ranges of flying height over which the sensitivity of the measurement is nearly zero. This aspect of the measurement method is particularly troublesome when the gap between the slider and the disk is less than 25 nm. Finally, it may be necessary to land every slider in a production test to calibrate the system for zero flying height.

In the paper entitled "A Visible Laser Interferometer for Air Bearing Separation measurement to Submicron Accuracy," by A. Niagam, Trans. ASME, Vol. 104, pp. 60–65 (1982) there is described an OFHT based on monochromatic light which also provides additional means of determining the interferometric fringe order. The additional means comprise a Xenon lamp and a circular variable wavelength filter. The lamp and wavelength filter function together as a tunable wavelength source with a range of 400 to 700 nm. As the wavelength is shifted, the interference pattern resulting from the thin-film effect is also shifted in a way which reveals the absolute flying height and thus the fringe order for the monochromatic measurement. Once the fringe order has been determined, the measurement proceeds with the monochromatic sensor at a rate of approximately 2.5 kHz.

Several other prior-art systems avoid the ambiguity problems of monochromatic interferometry by including multiple wavelengths. For example, a common form of OFHT is based on the effect of a thin film on the spectral distribution of white light, as is taught for example in the U.S. Pat. No. 4,593,368 to D. A. Fridge, et al. The apparatus in this patent comprises a computerized selector-photometer, which analyzes the wavelength-dependent modulation of white light reflected from the slider-disk interface. This technique is incorporated in commercially available products such as the line of Automatic Digital Flying Height Testers produced by Pacific Precision Laboratories, Inc. (PPL) of Chatsworth, Calif. White light interferometry has the significant advantage that there is no ambiguity in the measurement, since the spectral modulation phenomenon is not periodic with flying height. However, white light methods based on spectrometers suffer from a number of limitations, the most severe and intractable limitation being the measurement speed. This problem is compounded by the need to compensate for the phase change on reflection for as many as 171 different wavelengths (see, for example, an article entitled "Flying height measurement systems and slider absorption", by R. Pavlat, IDEMA Insight 7(5), p.1 (1994)). Finally, white light techniques are most effective for gaps greater than one-half the wavelength of the shortest wavelength used, i.e., approximately 200 nanometers, whereas the trend is towards flying heights of less than 25 nm.

In order to overcome some of the limitations of white light interferometry mentioned above, several prior-art OFHT's based on the thin-film effect use a small number of discrete wavelengths of light to improve speed and performance. In U.S. Pat. No. 5,280,340 to C. Lacey there is described a three-wavelength method of optically analyzing small spacings that comprises a high-intensity source of multiple-wavelength radiation and a detector assembly for rapid spectral analysis. The detector assembly includes wavelength discriminating beamsplitters, a filter for each individual wavelength to be measured and a high speed photodetector for each wavelength. The disclosed apparatus also comprises a mechanical assembly which is used to move the head away from the detection assembly a very small distance, on the order of 0.25 µm. This mechanism is required for calibration of the apparatus, which involves measurement of the intensity of the three wavelengths while partially unloading the slider to determine the maximum and minimum intensity at each wavelength. Once the system is calibrated, it is capable of measuring flying heights at rates greater than 100 kHz. The apparatus disclosed in this patent is the basis of the Dynamic Flying Height Tester manufactured by Phase Metrics. Cambrian Pacific Technologies also markets a three-wavelength technique OFHT, the principle distinction being the use of three lasers instead of the mercury arc lamp used in the Phase Metrics system.

Although three-wavelength OFHT's are much faster than older white-light instruments, they still share many of the same limitations, the most serious of which is that the measurement sensitivity approaches zero as the flying height approaches zero. These limitations are related principally to the reliance on thin-film interference effects, which are difficult to measure when the film thickness is small. Therefore the reliance on thin-film effects is a fundamental deficiency of all of the prior-art OFHT's cited above.

The limitations of the thin-film approach are largely avoided if the reflection from the slider ABS and the reflection from the disk surface can be separated in some way, either by polarization, physical separation of the beams, or both. The apparatus disclosed in commonly-owned U.S. Pat. No. 4,606,638 to G. Sommargren uses a transparent disk is a front surface polarizer, so that the reflection from this surface can be distinguished from the reflection from the ABS. An additional advantage of the disclosed apparatus is that the entire gap is measured by a camera having a plurality of detectors, thus making it possible to determine the shape and orientation of the slider, as well as other parameters of interest that require a plurality of measurement points. However, the manufacture of the special transparent disk with the polarization coating, as taught in the Sommargren patent, can be costly and any surface imperfections might cause problems at low flying height.

Another approach to separating the interfering beams in an optical flying-height tester is disclosed in commonly-owned U.S. Pat. No. 5,218,424 to G. Sommargren. The apparatus uses two parallel beams having orthogonal polarizations. Both beams are incident on the surface of the glass disk at Brewster's angle, so that one of the beams passes completely through the disk without reflection, and the other is partially reflected from the surfaces of the disk. The beam that passes through the disk without reflection is used to illuminate the ABS. The two beams are then recombined, resulting in an interference effect that varies sinusoidally with the flying height. Since the apparatus taught in this patent is a two-beam interferometer, it is possible to measure extremely small gaps without loss of sensitivity and precision, thus eliminating one of the principle disadvantageous of systems that depend on interference effects resulting directly from multiple reflections within the gap. The disclosed apparatus also comprises an array camera for imaging the entire ABS.

Despite these advantages, the method and apparatus disclosed in commonly-owned U.S. Pat. No. 5,218,424 has significant limitations that make it an impractical tool for automated inspection of the flight characteristics of sliders used in the magnetic storage industry. These limitations include the use of an expensive, complicated, high-speed phase modulator as an essential component; a very slow data acquisition and processing rate of approximately 15 Hz, which is due in part to the method of phase modulation and the need to integrate over a full rotation of the transparent disk; a very slow determination of the dynamic flight characteristics of the slider, which is due in part to the use of a full-frame imaging camera for all measurements; a deleterious sensitivity to inhomegeneaties and distortions in the transparent disk; a deleterious sensitivity to the tip and tilt of the disk, which can introduce substantial errors in the flying height measurement; and an overall drift in the interference phase due primarily to the presence of the high-speed phase modulator, resulting in an ambiguous phase offset.

There is therefore an unmet need for an apparatus and method for accurate, high-speed characterization of the flying characteristics of sliders.

SUMMARY OF THE INVENTION

The invention provides a method and means of high-speed characterization of the gap between two objects, one of which is a substantially transparent plane-parallel disk in rotation about an axis perpendicular to its largest surface, and the other has a substantially flat surface that is nearly in contact with the largest surface of the transparent plane-parallel object.

In accordance with a method of the invention, and means for accomplishing same, collimated light beam is divided into two parallel, spatially separated and orthogonally polarized beams. These beams are incident upon the surface of the disk at Brewster's angle, whereupon one of the beams passes through the disk without reflection, whilst the other beam suffers partial reflection at each of the surfaces of the disk. The beam that passes through the disk unreflected impinges upon the surface of the object, which in the present circumstances is analogous to the slider of a magnetic disk storage device. The beam reflected from the slider and the beam reflected from the surface of the disk in closest proximity to the slider are subsequently recombined into a single beam. This single beam therefore contains two mutually orthogonal beams, one corresponding to the disk surface, and the other corresponding to the surface of the slider.

In a next step, the two orthogonally polarized components in the recombined light beam are caused to interfere with each other on a detector or combination of detectors, in such a way as to provide information about the relative phase of the two polarization components. In a method of the invention, the interference is caused by first converting the linear polarizations to orthogonal circular polarizations. The beam is then divided into two or more identical beams, each of which is equipped with a polarizer and a detector to generate an interference effect with a phase offset determined by the orientation of each polarizer.

The phase difference measured in this way is related to the difference in optical paths of the beam that reflects from the slider surface and the beam that reflects from the disk surface. In that these two beams are spatially separated and do not follow identical paths through the disk, this one phase measurement includes unwanted details concerning the variations in volume and surface profile of the disk. To make the measurement substantially independent of these variations, a compensation measurement is made with a different pair of beams traveling parallel to the principal measurement beams.

The compensation beams are also created by division of the collimated source light into two parallel, spatially separated and orthogonally polarized beams. However, a half-wave plate is used to make the two polarizations identical before they impinge upon the disk surface. The selected polarization is that which allows reflections from the disk surfaces. The spatial position of the beams is such that neither beam is effected by the presence of the slider. The compensation beams reflect from the surface of the disk in closest proximity to the slider and are redirected towards a parallel detection and phase measurement apparatus. The phase difference is recorded electronically and is used to remove the unwanted details concerning the variations in volume and surface profile of the disk.

The presently preferred apparatus of the present invention also provides a method and means for efficiently sampling the phase at a plurality of points corresponding to various positions on the slider surface. The means for this method comprise a specialized detector array having independently-accessed detector elements. These elements may therefore be operated together to provide a complete image of the slider, or individually to provide high-speed information about the size of the gap between the slider and the disk at selected points.

BRIEF DESCRIPTION OF THE DRAWINGS

In the drawings, wherein like reference characters denote similar elements throughout the several views.

DETAILED DESCRIPTION OF THE INVENTION

Figure 1:
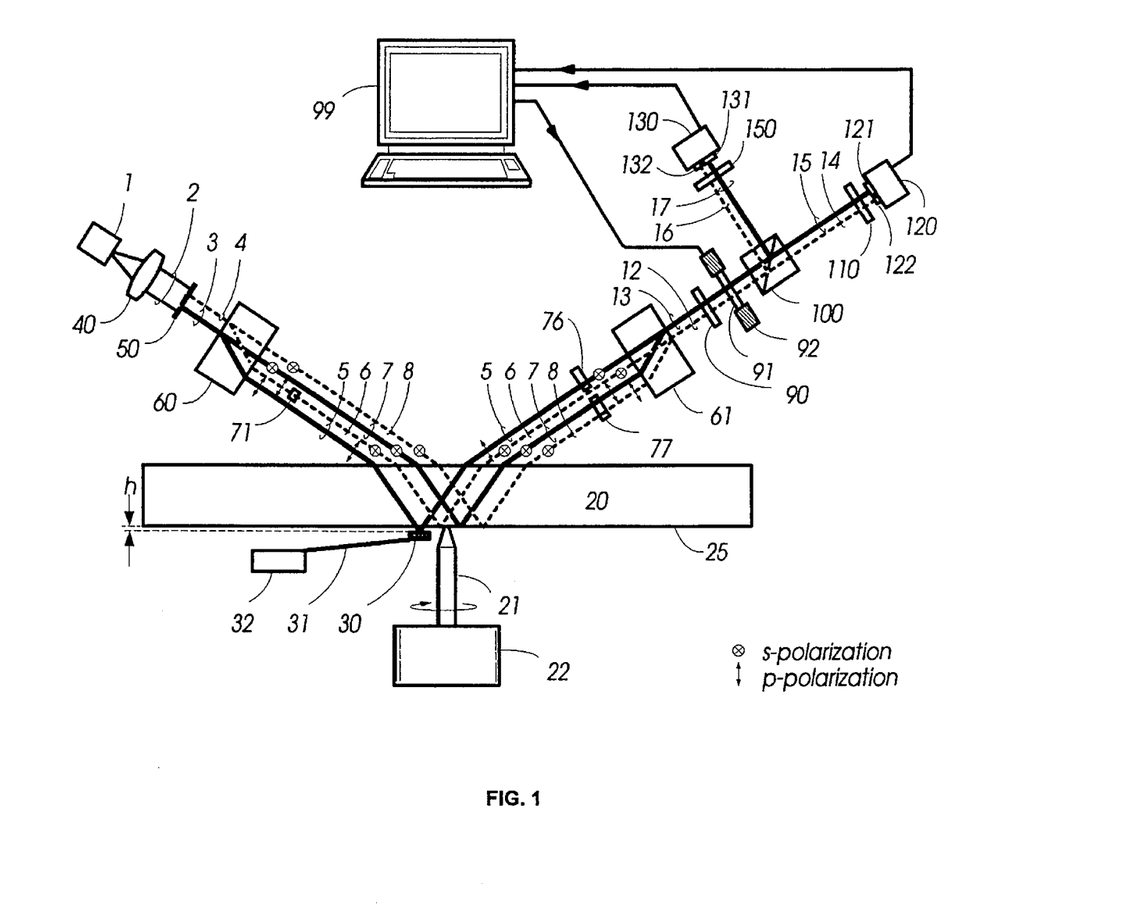
FIG. 1 is a drawing showing a preferred embodiment of the present invention setup to measure the distance of a flat object surface with respect to the surface of a rotating transparent disk.

Referring now to the drawings in detail, and initially to FIG. 1, FIG. 1 shows a preferred embodiment of the interferometer or the present invention for measuring the distance of an object surface that is heady in contact with a rotating transparent disk. The invention measures the gap between an object 30 and a rotating transparent disk 20. Disk 20 is shown attached to a spindle 21 driven by a motor 22, so the gap profile may be determined as a function of the speed of rotation of disk 20. The apparatus in this preferred embodiment is therefore suited to the prediction of the aerodynamic flight characteristics of a slider over the surface of a rotating magnetic storage medium.

The illumination is provided by a source 1, which is preferably a light-emitting diode, a laser diode, a gas laser, a discharge lamp or like source of light. A lens 40 preferably collimates the source light into a beam 2. An aperture 50 preferably divides beam 2 into a measurement beam 3 and a compensation beam 4. Before considering the function of the compensation beam 4, the path and function of the measurement beam 3 will be described.

Measurement beam 3 preferably passes through a polarizing beam separator 60, which may for example be a birefringent prism. Polarizing beam separator 60 splits beam 3 into two spatially separated beams 5 and 7 having mutually orthogonal polarizations. The polarization of beam 5 is illustrated as being in the plane of FIG. 1 (p-polarization), while that of beam 7 is illustrated as being perpendicular to the plane of FIG. 1 (s-polarization). The plane of FIG. 1 is also the plane of incidence of beams 5 and 7 with respect to disk 20.

Beams 5, 7 are incident on the top surface of disk 20 at Brewster's angle, $\theta_B$, which is given by $$\theta_B = \tan^{-1}(n) \quad (1.)$$

where n is the index of refraction of disk 20. A well-known principle of optics is that a beam polarized parallel to the plane of incidence traverses a boundary between two media without reflection when the incident angle is equal to Brewster's angle. Therefore beam 5 in FIG. 1 passes through disk 20 without reflection. Beam 5 then reflects from the surface of object 30, and passes back through disk 20 without reflection. Beam 7 on the other hand, suffers partial reflection at each of the boundaries between disk 20 and the surrounding air. For example, if disk 20 is made of ordinary glass having an index of refraction of 1.5, and if the source wavelength is 600 nm, approximately 20% of beam 7 is reflected at each of the boundaries between disk 20 and the surrounding air. Of particular interest is the portion of beam 7 which is reflected from a bottom surface 25 of disk 20 and which is transmitted out of the disk 20, as shown in FIG. 1. Other beams due to the various reflections of beam 7 from the surfaces of disk 20 are preferably of no interest for purposes of the present invention.

After beam 5 reflects from surface 25, a half-wave plate 76 preferably rotates the polarization of beam 5 to an angle perpendicular to the plane of incidence. Another half-wave plate 77 preferably also rotates the polarization of beams 7 into the plane of incidence. A polarizing beam separator 61 is preferably used in the reverse orientation so that it recombines beam 5 with beam 7 into a beam 13. Thus beam 13 is composed of the two orthogonally polarized beams 5 and 7.

In a next step, beam 13 passes through a quarter-wave plate 90, which is preferably oriented so that the two orthogonal linear polarizations corresponding to beams 5 and 7 in beam 13 are converted to circular polarizations. This conversion is preferably effected by placing the principle axis of quarter-wave plate 90 at an angle of 45 degrees, as measured about an axis parallel to the light beam passing through it, and with respect to the plane of the FIG. 1. The orthogonal linear polarizations are in this way converted to orthogonal circular polarizations, where by orthogonal it is meant that one of the circular polarizations is right handed, and the other is left handed.

Beam 13 then preferably passes through a half-wave plate 91, which is held in a mount 92 which permits rotation of half-wave plate 91 about an axis parallel to the light beam passing through it. The effect of rotating half-wave plate 91 is to change the phase difference between the two circular polarizations. A mechanical mount 92, preferably motorized and under the control of a computer 99, rotates half-wave plate 91 as needed to adjust this phase difference.

Non-polarizing beam splitter 100 preferably divides beam 13 into two beams 15 and 17 having substantially identical polarization and phase characteristics. Beam 15 preferably passes through a polarizer 110 before impinging upon a detector 121. Therein results an interference effect which modulates the intensity measured by detector 121. The interference pattern corresponds to the difference in optical path between beams 5 and 7 through the apparatus. Since beam 5 passes entirely through disk 20 and reflects from the surface of object 30, the interference effect measured by detector 121 relates to the relative position of object 30 with respect to a surface 25 of disk 20. A formula for this intensity $g_1$ measured at detector 121 is $$g_1 = \frac{Q}{2}(1 + V\cos(\phi_1)) \quad (2.)$$

where V is the interference contrast and $\phi_1$ is the interferometric phase. The phase $\phi_1$ in Eq.(2) is itself related in part to the mean wavelength $\lambda$ of the illumination, the size h of the gap between object 30 and disk 20, and the angular position $\theta$ of polarizer 110 as measured about an axis parallel to beam 7. A formula for phase $\phi_1$ is $$\phi_1 = [4\pi \cos(\alpha)/\lambda]h + 2\theta_1 + 2\pi L(\beta) + \delta_0, \quad (3.)$$

where $\alpha$ is the angle of incidence, and $\delta_0$ is a constant phase offset. The quantity $L(\beta)$ in Eq.(3.) is the optical path difference traversed by beams 5 and 7, exclusive of the gap of size h between disk 20 and object 30. The optical path difference $L(\beta)$ includes such factors as volume irregularities in disk 20 as well as imperfections in surface 25, which in general vary with the rotational angle $\beta$ of disk 20.

In a similar manner as beam 15, beam 17 passes through a polarizer 150 before impinging upon a detector 131. Therein results an interference effect which modulates the intensity measured by detector 131. The interference pattern also corresponds to the difference in optical path between beams 5 and 7 through the apparatus, the only difference being the orientation of polarizer 150. The intensity measured at detector 131 is $$g_2 = \frac{Q}{2}(1 + V\cos(\phi_2)), \quad (4.)$$

where $$\phi_2 = [4\pi \cos(\alpha)/\lambda]h + 2\theta_2 + 2\pi L(\beta) + \delta_0, \quad (5.)$$

and $\theta_2$ is the angular position of polarizer 150 as measured about an axis parallel to beam 17. Apart from the angle $\theta_2$, the intensity $g_2$ is the same as $g_1$. Since the phase constant $\delta_0$ is preferably of little interest, it will be set to zero and will not appear in subsequent equations.

Polarizers 110 and 150 are preferably adjusted so that angles $\theta_1$ and $\theta_2$ differ by 45 degrees. As a result of this adjustment, the interferometric phases $\phi_1$ and $\phi_2$ differ by 90 degrees. Therefrom results the following two equations:

$$g_1 - g_2 = \sqrt{2}\, QV \cos\left( \frac{4\pi\cos(\alpha)h}{\lambda} + 2\pi L(\beta) \right) \tag{6.}$$

$$g_1 + g_2 - Q = \sqrt{2}\, QV \sin\left( \frac{4\pi\cos(\alpha)h}{\lambda} + 2\pi L(\beta) \right) \tag{7.}$$

Therefore $$h = \frac{\lambda}{4\pi \cos(\alpha)} [M(\beta) - 2\pi L(\beta)] \tag{8.}$$

where $$M(\beta) = \tan^{-1}\left( \frac{g_1 + g_2 - Q}{g_1 - g_2} \right). \tag{9.}$$

An accurate measurement $M(\beta)$ requires precise knowledge of the average intensity Q, which under the supposed conditions of the measurement is preferably essentially constant, and may be determined by an independent measurement. This independent measurement may be made at low speed, preferably by using mount 92 to rotate half-wave plate 91 while recording the variation in measured intensity. Alternatively, mechanical means 32 adjusts the position of object 30 so as to modulate the interference pattern.

In Eq.(8) it is shown explicitly that the phase measurement $M(\beta)$ and the optical path difference $L(\beta)$ are both functions of the rotational angle $\beta$ of disk 20, but the flying height h is not. The flying height h is in general a dynamic variable, but is not a direct function of the variation in volume uniformity or surface flatness of disk 20. Therefore the optical path difference $L(\beta)$ must be known before the correct flying height h can be determined. The apparatus of the present invention provides a convenient means of continuously compensating for the surface and volume irregularities in disk 20, as well as any other variations in optical path that are not related to the distance h. Referring to FIG. 1, there is shown compensation beam 4 represented by a dashed line. As will presently be shown, compensation beam 4 preferably provides a direct measure of the optical path difference $L(\beta')$, where $\beta'$ is a slightly different angle from $\beta$. Since the disk is in constant rotation, the compensation beam provides a way of mapping the variation in volume uniformity and surface flatness of disk 20.

Referring once again to FIG. 1, compensation beam 4 preferably passes through a polarizing beam separator 60, which splits beam 4 into two spatially separated beams 6 and 8 having mutually orthogonal polarizations. The polarization of beam 6 is preferably in the plane of FIG. 1, while that of beam 8 is perpendicular to the plane of FIG. 1. Preferably, a half-wave plate 71 subsequently rotates the polarization of beam 6 so that it is also perpendicular to the plane of FIG. 1. Because both beams 6 and 8 have perpendicular polarizations, they both have partial reflections from surface 25 of disk 20, as is shown in the FIG. 1. Beam 8 subsequently passes through half-wave plate 77, which rotates the polarization of beam 8 into the plane of the FIG. 1. In a next step, a polarizing beam separator 61 is preferably used in the reverse orientation so that it recombines beam 6 with beam 8 into a beam 12. Thus beam 12 is composed of the two orthogonally polarized beams 6 and 8.

In a similar manner as for beam 13, beam 12 preferably passes through a quarter-wave plate 90, which converts the two orthogonal linear polarizations corresponding to beams 6 and 8 in beam 12 to orthogonal circular polarizations. Beam 12 then preferably passes through a half-wave plate 91, thus providing a means of continuously adjusting the phase difference between the two circular polarizations.

Non-polarizing beam splitter 100 divides beam 12 into two beams 14 and 16 having substantially identical polarization and phase characteristics. After passing through polarizers 110 and 150, respectively, the intensities $g'_1$ and $g'_2$ of beams 14 and 16 are measured by detectors 122 and 132. The measured intensities vary according to interference effects that are a function of a distance $L(\beta')$ equal to the optical path difference for beams 6 and 8 through the apparatus. Following the same line of reasoning that lead to Eq.(8.) above, it can be shown that $$2\pi L(\beta') = C(\beta') \tag{10.}$$

where $$C(\beta') = \tan^{-1}\left( \frac{g_1' + g_2' - Q'}{g_1' - g_2'} \right). \tag{11.}$$

Defining $$\beta_0 = \beta - \beta' \tag{12.}$$

we find that $$h = \frac{\lambda}{4\pi \cos(\alpha)} [M(\beta) - C(\beta - \beta_0)]$$

Therefore, by storing the compensation measurements C, we are able to subsequently subtract from the measurement M all of the variations due to nonuniformity in the volume and surface characteristics of disk 20. Since disk 20 is in constant motion, it is only necessary to store the value of C long enough for the disk to advance an angular distance $\beta_0$.

Figure 2:
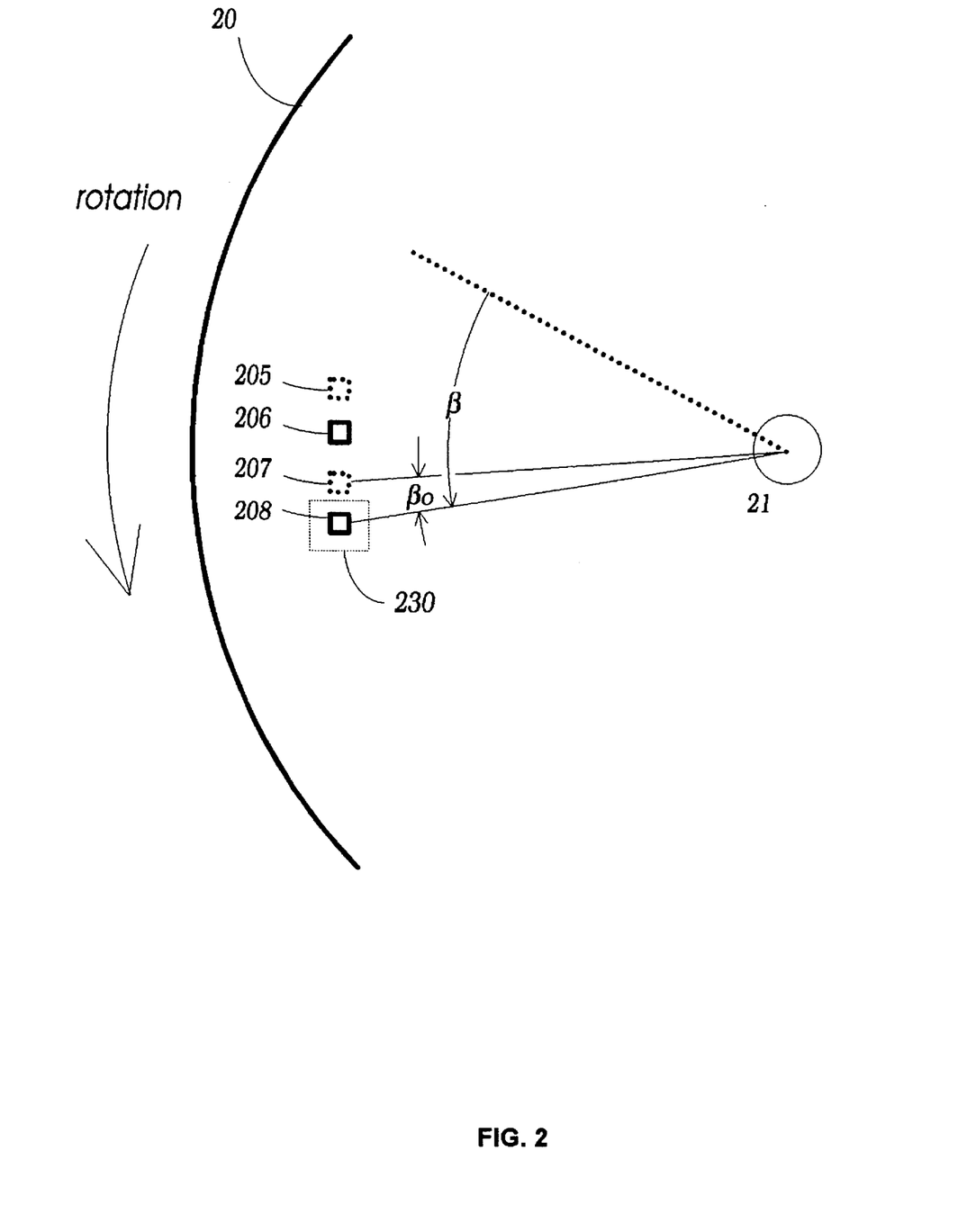
FIG. 2 is a drawing showing the disk of FIG. 1 from the top, indicating the positions of the object and of the various measurement points.

These consideration will be made clearer by referring to FIG. 2. FIG. 2 shows disk 20 as viewed from the underside, with object 30 and most of the other components of the apparatus removed for clarity. Only an outline 230 of the ordinary position of object 30 is shown in FIG. 2 in order to clarify the orientation of FIG. 2 with respect to the apparatus illustrated in FIG. 1. There are shown four measurement spots 205, 206, 207, 208 correspond to beams 5,6,7,8 respectively. As discussed above, phase measurement $M(\beta)$ corresponds to interference between beams 5 and 7, while compensation $C(\beta')$ is performed with beams 6 and 8. Since disk 20 is in rotation, those portions of disk 20 that contribute to measurement $C(\beta')$ will, after an advance $\beta_0$ in the angular position of disk 20, be the same portions of disk 20 that contribute to measurement $M(\beta)$. It follows therefore that the quantity $[M(\beta) - C(\beta - \beta_0)]$ is independent of variations in the volume and surface characteristics of disk 20.

It is noteworthy that Eq.(8.) is independent of the fringe contrast V, and also is valid over the entire $2\pi$ interference phase range. Thus the preferred method of the present invention is accurate for any height h, and does not suffer the limitations of prior-art methods, which often are only accurate over a pre-determined range of flying heights, and then only after exhaustive calibration to determine both Q and V. The preferred apparatus of the present invention is accurate down to zero flying height, and does not require any calibration of the fringe contrast V.

Referring again to FIG. 1, it will be appreciated by those skilled in the art that detectors 121 and 131 and 122 and 132 may each be individual detectors, or linear array detectors, or two-dimensional array detectors. There will now be described a preferred embodiment of a detector geometry having several inventive features.

Figure 3:
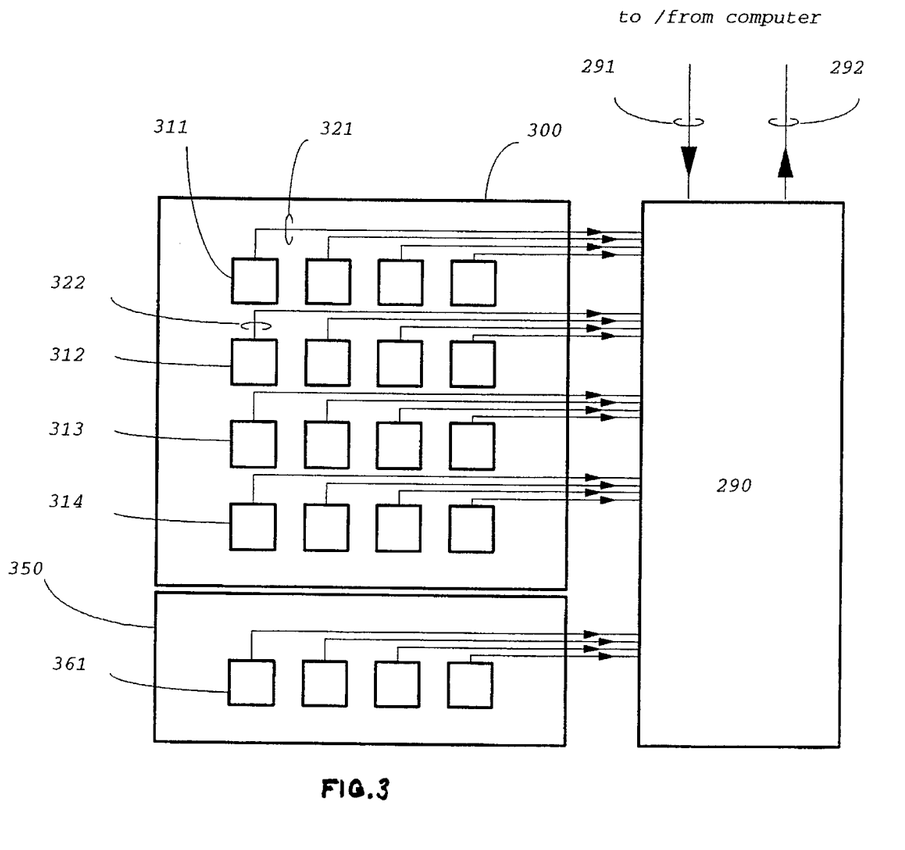
FIG. 3 is a drawing depicting a 16×16 detector array and the presently preferred method by which individual detectors are selected for high-speed operation.

The form of a preferred embodiment of detectors 121, 122,131,132 is more clearly understood by reference to FIG.

3. There is shown schematically in FIG. 3 an array detector 300, which corresponds to detectors 121 and 131 in FIG. 1, and support electronics 290, which corresponds to support electronics 120 and 130 in FIG. 1. There is also shown a linear detector 350, which corresponds to detectors 122 and 132 in FIG. 1. In accordance with the preferred embodiment of detectors 300 and 350, an individual detector element or pixel, for example a pixel 311, may preferably be accessed directly by support electronics 290 via a direct electrical connection 321. This has the consequence that detector array 300 may be operated in one of two ways, i.e., as an imaging camera or as a small number of selected individual detectors.

When the detector array 300 is operated as an imaging camera, preferably support electronics 290 collects intensity information from all pixels in the detector array 300, and sends this information to computer 15 in the form of a parallel or serial signal that may be used to generate a full two-dimensional image of the intensity distribution across the array. In this mode, each of the detectors in array 350 are used to compensate for the variations in surface and volume characteristics of rotating disk 20 shown in FIG. 1. For example, detector element 361 provides information that is used to compensate signals obtained from the column of detector elements 311, 312, 313, 314.

When the detector array 300 is operated as a small number of selected individual detectors, preferably support electronics 290 accepts signals from a small number of individual pixels, say for example pixels 311, 314 and 361, and sends them in suitable form to computer 15. This method may therefore be used for very high-speed data acquisition, for example at 250 kHz, while the previously described method is best suited to imaging the slider-disk interface at a much reduced rate, for example at 1 kHz. The selection of individual pixels for this method is preferably made by the instrument operator, who preferably chooses suitable pixels by inspection of the images generated with the previous method. Preferably, these pixels correspond to three or more points on the ABS, so that the instrument can determine dynamically the orientation of the slider (pitch and roll) as well as the flying height.

Those skilled in the art will appreciate that alternative detection means and data processing methods may be used without departing from the spirit and scope of the present invention. For example, although description of the present invention describes a form of quadrature phase detection, alternate forms of phase detection may be substituted according to the required functionality of an embodiment. One alternate form of phase detection requires only one pair of detectors, e.g. 121 and 122 in FIG. 1, and dispenses with detectors 130, 131 and associated optics and eletronics. The phase estimation method proceeds by performing a sequence of measurements with half-wave plate 91 at different orientations, thus providing intensity measurements for a sequence of phase shifts. Another alternate form of phase detection uses three or more pairs of detectors and associated optics and electronics, to improve the precision of the measurement and remove the need to determine the average intensity Q by a separate measurement. Yet another phase estimation technique suitable for use with the method of the present invention is heterodyne interferometry, as described on pages 70, 71, 73 and 189 of the book "Basics of Interferometry" by P. Hariharan (Academic Press, Boston, 1992). In each of these alternative embodiments, the underlying purpose is to estimate the phase of the interference effects generated by the division and recombination of beams 3 and 4 in FIG. 1. Thus it will be appreciated that the quadrature detection method is only one example of phase estimation compatible with the underlying principles taught by the present invention.

Those skilled in the art will also appreciate that additional optical elements may be disposed advantageously to improve the quality of the illumination and imaging. For example, a lens or combination of lenses may be used for imaging object 30 onto detectors 121 and 131. Further substitutions, omissions and changes in form or detail of the disclosed methods and apparatus may be made without departing from the spirit and scope of the present invention.

By utilizing the preferred method and apparatus of the present invention, there is a linear relationship between the measured phase and the spacing, h, due to the fact that this apparatus is a two beam interferometer. Prior-art approaches based on thin film effects, on the other hand, have a non-linear relationship between the distance, h, and both the intensity and phase of the interference pattern in the image, making the determination of h more difficult and less accurate. In addition, the apparatus of the present invention can measure the distance, h, down to zero, i.e. to contact between the ABS and the bottom of the rotating glass disk, whereas prior-art approaches based on thin film effects may lose measurement sensitivity in this region with some sliders, because the intensity of the interference pattern or patterns may go to zero as h approaches zero. The apparatus of the present invention can also measure the distance, h, simultaneously, at multiple user selectable locations over the ABS without requiring mechanical translation, thereby increasing the measurement throughput substantially and providing better accuracy for the pitch and roll measurements. Furthermore, the apparatus of the present invention may operate with a monochromatic light source, thereby, providing greater measurement signal intensity and cleaner modeling to compensate for transparent overcoats on the surface under test and for dissimilar material effects. Apart from the above, the disclosed optical geometry of the present invention provides substantially equal optical path lengths for all of the beams, and is therefore independent of small frequency fluctuations of the source, and is compatible with light sources that are not strictly monochromatic, for example, multimode laser diodes, light-emitting diodes, arc lamps and the like. In addition, the apparatus of the present invention operates with the measurement sensitivity near its maximum at whatever value of h is being measured, even with h~0. The apparatus of the present invention is also insensitive to the angular variations of the rotating glass disk and has extremely high frequency response, i.e. better than 250 kHz. Furthermore, with the apparatus of the present invention, the intensities of the measurement and reference beams can be made nearly equal to get maximum contrast in the interference pattern, thereby maximizing signal to noise. In addition, multiple pixels can be measured simultaneously along a portion of the ABS to obtain information on the shape of the ABS surface, and the location of the point on the ABS where h is a minimum can be found rapidly without the need to translate the apparatus, thereby increasing throughput substantially. Finally, with the apparatus of the present invention, it is not necessary to calibrate the detectors by mechanically adjusting the height h, as is required for several prior-art methods, in order to determine the maximum and minimum signal strength.

What is claimed is:

1. A method for measuring the distance of an object surface with respect to a surface of a rotating disk, said disk comprising a substantially transparent plane-parallel disk in rotation about an axis normal to its largest surface, said object surface comprising a substantially flat surface that is in close proximity to said disk surface, said method comprising the steps of:

providing a pair of parallel, spatially separated and orthogonally polarized beams incident upon said disk surface at Brewster's angle, one of said beams passing through said disk without reflection, the other of said beams suffering partial reflection at each of said surfaces of said disk, said one beam impinging upon said object surface and being reflected therefrom;

combining said beam reflected from said disk surface with said beam reflected from said object surface for forming a recombined beam comprising two mutually orthogonally polarized beams, one corresponding to the disk surface and the other corresponding to the object surface;

causing said recombined beam orthogonally polarized components to interfere with each other at a detector for providing information about the relative phase of said two polarization components, said information being related to the difference in optical paths of said beam reflected from said disk surface and said beam reflected from said object surface; and removing any unwanted details concerning variations in volume and surface profile of said disk from said information for providing said measured distance; whereby information about the size of the gap between said object surface and said disk surface may be provided from said measured distance, said removing step comprising the step of making a compensation measurement to compensate for said unwanted details with a different pair of beams traveling parallel to the principal measurement beams.

2. A method for measuring the distance of an object surface with respect to the surface of a rotating disk in accordance with claim 1 wherein said object surface comprises a slider of a magnetic disk storage device.

3. A method for measuring the distance of an object surface with respect to the surface of a rotating disk in accordance with claim 1 wherein said interference causing step comprises the step of converting the linear polarizations of said recombined beam into orthogonal circular polarizations.

4. A method for measuring the distance of an object surface with respect to the surface of a rotating disk in accordance with claim 3 wherein said interference causing step further comprises the step of dividing said circularly polarized recombined beam into a plurality of identical beams each equipped with a polarizer and a detector for generating an interference effect with a phase offset determined by the orientation of each polarizer, said measured phase difference being related to the difference in optical paths of the beam reflected from said object surface and the beam reflected from said disk surface.

5. A method for measuring the distance of an object surface with respect to the surface of a rotating disk in accordance with claim 4 wherein said step of providing said orthogonally polarized beams incident upon said disk at Brewster's angle comprises the step of dividing a collimated light beam into said parallel spatially separated and orthogonally polarized beams, and said compensation measurement making step comprises the step of dividing said collimated light beam into another pair of parallel spatially separated and orthogonally polarized beams and making the two polarizations identical before they impinge upon said disk surface, the spatial position of the beams being such that neither beam is effected by the presence of the object surface, the selected polarization allowing reflections from said disk surface.

6. A method for measuring the distance of an object surface with respect to the surface of a rotating disk in accordance with claim 5 wherein said reflections from said disk surface comprise compensation beams, said compensation measurement making step further comprising the step of detecting and phase measuring said compensation beams reflected from said disk surface.

7. A method for measuring the distance of an object surface with respect to the surface of a rotating disk in accordance with claim 1 wherein said step of providing said orthogonally polarized beams incident upon said disk at Brewster's angle comprises the step of dividing a collimated light beam into said parallel spatially separated and orthogonally polarized beams.

8. A method for measuring the distance of an object surface with respect to the surface of a rotating disk in accordance with claim 1 further comprising the step of sampling the phase at a plurality of points corresponding to various positions on the object surface.

9. A method for measuring the distance of an object surface with respect to the surface of a rotating disk in accordance with claim 8 wherein said object surface comprises the slider of a magnetic disk storage system.

10. A method for measuring the distance of an object surface with respect to the surface of a rotating disk in accordance with claim 1 wherein said step of providing said orthogonally polarized beams incident upon said disk at Brewster's angle comprises the step of dividing a collimated light beam into said parallel spatially separated and orthogonally polarized beams, and said compensation measurement making step comprises the step of dividing said collimated light beam into another pair of parallel spatially separated and orthogonally polarized beams and making the two polarizations identical before they impinge upon said disk surface, the spatial position of the beams being such that neither beam is effected by the presence of the object surface, the selected polarization allowing reflections from said disk surface.

11. A method for measuring the distance of an object surface with respect to the surface of a rotating disk in accordance with claim 10 wherein said reflections from said disk surface comprise compensation beams, said compensation measurement making step further comprising the step of detecting and phase measuring said compensation beams reflected from said disk surface.

12. A method for measuring the distance of an object surface with respect to a surface of a rotating disk, said disk comprising a substantially transparent plane-parallel disk in rotation about an axis normal to its largest surface, said object surface comprising a substantially flat surface that is in close proximity to said disk surface, said method comprising the steps of:

providing a pair of parallel, spatially separated and orthogonally polarized beams incident upon said disk surface at Brewster's angle, one of said beams passing through said disk without reflection, the other of said beams suffering partial reflection at each of said surfaces of said disk, said one beam impinging upon said object surface and being reflected therefrom;

combining said beam reflected from said disk surface with said beam reflected from said object surface for forming a recombined beam comprising two mutually orthogonally polarized beams, one corresponding to the disk surface and the other corresponding to the object surface;

causing said recombined beam orthogonally polarized components to interfere with each other at a detector for providing information about the relative phase of said two polarization components, said information being related to the difference in optical paths of said beam reflected from said disk surface and said beam reflected from said object surface; and removing any unwanted details concerning variations in volume and surface profile of said disk from said information for providing said measured distance; whereby information about the size of the gap between said object surface and said disk surface may be provided from said measured distance, the distance h being the flying height being measured represented by the expression $$h = \frac{\lambda}{4\pi \cos(\alpha)} [M(\beta) - C(\beta - \beta_0)]$$

where $\beta_0$ is an angular distance represented by $\beta_0 = \beta - \beta'$, where $\beta$ is the rotational angle of said axis, $C(\beta')$ is a compensation measurement represented by $$C(\beta') = \tan^{-1}\left(\frac{g_1' + g_2' - Q'}{g_1' - g_2'}\right),$$

where $g'_1$ and $g'_2$ are intensity measurements acquired in phase quadrature and $Q'$ represents an average intensity, $M(\beta)$ is a phase measurement represented by $$M(\beta) = \tan^{-1}\left(\frac{g_1 + g_2 - Q}{g_1 - g_2}\right),$$

where $g_1$ and $g_2$ are intensity measurements acquired in phase quadrature and Q represents an average intensity, and $\alpha$ represents the angle of incidence.

13. An interferometer apparatus for measuring the distance of an object surface with respect to the surface of a rotating disk, said disk comprising a substantially transparent plane-parallel disk in rotation about an axis normal to its largest surface, said object surface comprising a substantially flat surface that is in close proximity to said disk surface, said apparatus comprising a collimated light beam source; means for dividing said collimated light beam into a first pair of parallel spatially separated and orthogonally polarized beams; means for directing said polarized beams to be incident upon said disk surface at Brewster's angle, one of said first pair of beams passing through said disk without reflection, the other of said beams suffering partial reflection from said disk surface; means for directing said one beam passing through said disk unreflected for impinging upon said object surface; means for recombining said beam reflected from said disk surface with said beam reflected from said object surface and for causing said beams to interfere for providing information about the relative phase of said two polarization components of said recombined beam; means for removing any unwanted details concerning variations in volume and surface profile of said disk from said information for providing said measured distance; and means for dividing said collimated beam into a second pair of parallel spatially separated beams having a polarization for causing both of said pair of beams to be reflected from said disk surface, said second pair of reflected beams comprising compensation beams for enabling said unwanted details concerning any variations in volume and surface profile to said disk to be removed.

14. An interferometer apparatus in accordance with claim 13 wherein said object surface comprises a slider of a magnetic disk storage device.

15. An interferometer apparatus in accordance with claim 13 further comprising means associated with said recombined beam for converting the linear polarizations of said recombined beam into orthogonal circular polarizations.

16. An interferometer apparatus in accordance with claim 15 further comprising means for dividing said circularly polarized recombined beam into a plurality of identical beams, each equipped with a polarizer means and a detector means for generating an interference effect with a phase offset determined by the orientation of each polarizer, the measured phase difference being related to the difference in optical paths of the beam reflected from said object surface and the beam reflected from said disk surface.

17. An interferometer apparatus in accordance with claim 16 further comprising means for recombining said compensation beams and causing said compensation beams to interfere.

18. An interferometer apparatus in accordance with claim 17 wherein said removing means further comprises means for detecting and phase measuring said compensation beams and for removing said unwanted details from said measurement from said information based thereon.

19. An interferometer apparatus in accordance with claim 13 further comprising means for sampling the phase at a plurality of points corresponding to various positions on said object surface.

20. An interferometer apparatus in accordance with claim 19 wherein said sampling means comprises a plurality of detector arrays having individually accessed detector elements capable of providing information about the orientation of said object surface at high speed.

21. An interferometer apparatus in accordance with claim 13 further comprising means for recombining said compensation beams and causing said compensation beams to interfere.

22. An interferometer apparatus in accordance with claim 21 wherein said removing means further comprises means for detecting and phase measuring said compensation beams and for removing said unwanted details from said measurement from said information based thereon.

\* \* \* \* \*